US012481485B2

(12) United States Patent
Wang et al.

(10) Patent No.: US 12,481,485 B2
(45) Date of Patent: Nov. 25, 2025

(54) NESTED BUILD AUTOMATION FOR SOFTWARE DEPENDENCIES

(71) Applicant: Oracle International Corporation, Redwood Shores, CA (US)

(72) Inventors: Jiun-Cheng Wang, San Jose, CA (US); Harish Santhanagopal, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 190 days.

(21) Appl. No.: 17/492,967

(22) Filed: Oct. 4, 2021

(65) Prior Publication Data

US 2023/0103989 A1 Apr. 6, 2023

(51) Int. Cl.
*G06F 8/41* (2018.01)
(52) U.S. Cl.
CPC .................................. *G06F 8/433* (2013.01)
(58) Field of Classification Search
CPC ..... G06F 8/30; G06F 8/34; G06F 8/36; G06F 8/433
See application file for complete search history.

(56) References Cited

U.S. PATENT DOCUMENTS

| | | | | |
|---|---|---|---|---|
| 10,705,835 | B2* | 7/2020 | Banerjee | G06F 8/60 |
| 2018/0025160 | A1* | 1/2018 | Hwang | G06F 8/71 |
| | | | | 726/25 |
| 2022/0318395 | A1* | 10/2022 | Janakiraman | G06F 21/577 |

FOREIGN PATENT DOCUMENTS

CN 113050938 A * 6/2021 ............... G06F 8/33

OTHER PUBLICATIONS

Yongming Yao et al., "CD3T: Cross-Project Dependency Defect Detection Tool", [Online], pp. 2329-2337, [Retrieved from Internet on Feb. 9, 2023], <http://www.ijpe-online.com/EN/Y2019/V15/19/2329> (Year: 2019).*

V'ictor Sande Veiga et al. "Evaluation and Benchmarking of Singularity MPI Containers on EU Research e-Infrastructures" [Online], IEEE 2019, pp. 1-10, [Retrieved from Internt on Jul. 2, 2025], <https://ieeexplore.ieee.org/stamp/stamp.jsp?tp=&arnumber=8950983> (Year: 2019).*

* cited by examiner

*Primary Examiner* — Ziaul A Chowdhury
(74) *Attorney, Agent, or Firm* — Kilpatrick Townsend & Stockton LLP

(57) ABSTRACT

A main build environment may create a container for the main source code and any required utilities when building a software application. This container may be populated with an operating system, a configuration that includes instructions for performing the build, toolchains needed for the build, and/or other utilities. If any dependencies on third-party software modules exist, the build environment may create a new container and import the source code for the software module instead of simply importing the precompiled software modules into the build environment. The new container may similarly include toolchains and a configuration specific to building the software module. The software module may then be built within its separate container to generate an executable artifact that may be uploaded/imported into the main build environment during the main build process. Software dependencies can thus be built as part of the main build process from source code.

20 Claims, 11 Drawing Sheets

NESTED BUILD AUTOMATION FOR SOFTWARE DEPENDENCIES

BACKGROUND

In a software development lifecycle, the continuous integration and continuous deployment of software application focuses on building a single set of source code files as part of a main build. To make the development cycle more efficient and promote code reuse, many builds will utilize third-party software modules that can be downloaded and incorporated into the project. Any software modules on which the main build depends are downloaded as pre-compiled and packaged artifacts during the lifecycle from third-party software providers. While these pre-compiled software modules are readily available from other providers, they are difficult to validate for many modern coding requirements. For example, the security of third-party binaries can only be verified by relying on the limited information provided by the third party vendor. Debug procedures may not be available with compiled software, and thus testing and troubleshooting may be impossible. Therefore, improvements are needed in how third-party software modules are incorporated into build subsequent processes.

BRIEF SUMMARY

In order to validate each component of a software build, an automated, nested build environment is described that explores the dependencies between each of the software modules in a build pipeline and allows the main build environment to compile the source code for each software module on which the main source code depends. This allows software developers for the software application to use the existing, un-compiled source code to verify functional requirements, ensure licensing standards are met, ensure coding standards are met, evaluate security standards that may be required by the software application, and so forth. This also allows the compilation of the main source code and the execution of the main build environment to be repeatable and predictable over time. Because the source code is included as part of the main build environment for any third-party, fourth-party, etc., dependencies, all of the code can be stress tested and debugged at every level. In short, these embodiments allow the software application to be built from the source code up in the main build environment rather than relying on any third-party distributions to ensure that requirements are met.

The process may begin in a main build environment by creating a container for the main source code and any required utilities. This container may be populated with an operating system, a configuration that includes instructions for performing the build, toolchains needed for the build, and/or other utilities. The build process may then determine if any dependencies exist on third-party software modules by examining the main source code and/or the configuration in the main container. Instead of simply importing the pre-compiled software modules into the build environment, the build environment may create a new container and import the source code for the third-party software module. The new container may similarly include an operating system, toolchains, a configuration, and so forth. The third-party software module may then be built within its separate container to generate an executable artifact that may be uploaded/imported into the main build environment during the main build process. Thus, any software dependencies can be built as part of the main build process from source code.

This process may be recursively carried out on each level of dependencies in the build process. For example, a third-party software module may be analyzed in a similar fashion to determine any fourth-party software module dependencies. Source code can be retrieved for these dependencies and built in new containers. A dependency graph may be recursively generated and traversed during the build process to spin up new containers for building new software modules from source code files. Resulting compiled artifacts at each dependency level may be imported into the parent containers. Because multiple software dependencies may exist at each level, the build processes executing each of these new container builds may be carried out in parallel.

To minimize the number of times software modules need to be rebuilt locally from source code, a repository can store validated source code files along with validated and compiled software modules. Images for the containers can also be saved. When a software module is needed in a new build process, the repository can return the pre-compiled code when it is still current and corresponds to the latest source code file. New build projects can upload the compiled third-party software modules to the repository for future reuse. When the software modules need to be rebuilt, the stored container image may be reused to rebuild from the source code and update the stored version of the compiled software module.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components.

In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
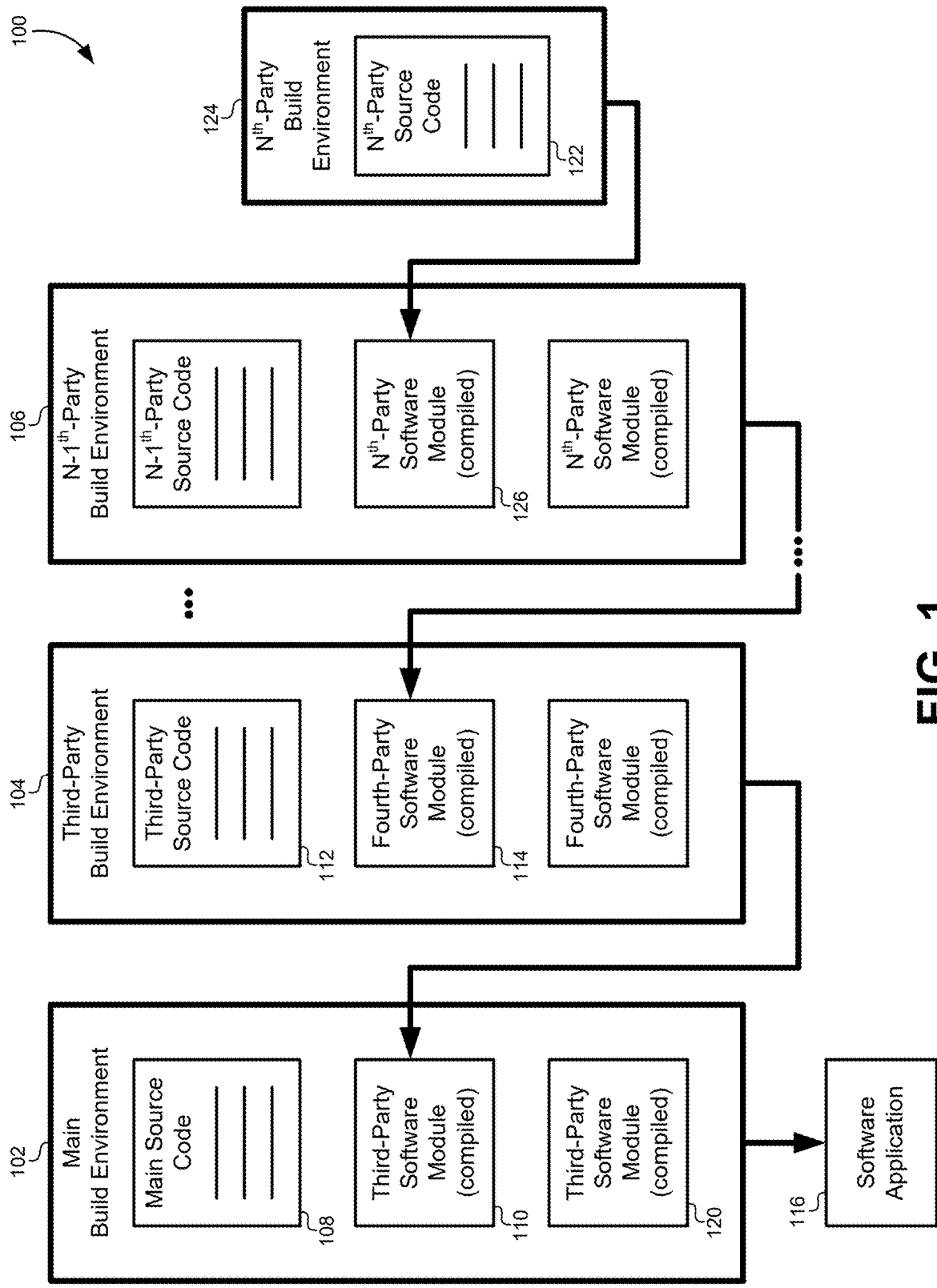
FIG. 1 illustrates a software build pipeline for software applications, according to some embodiments.

Most software applications that are produced today require significant support from third-party products and/or libraries that are introduced as part of the software build process. A software build is a set of executable code files that are used to compile source code for a software application. A build may also refer to the build process itself, where a software developer uses build code to compile the source code of a software application and turn the source code into a functional executable. The software build may also include files that contain instructions for executing the build process, such as make files, configuration files, scripts, build files, and/or other files that may instruct the system on how to compile, assemble, link, and otherwise process source code files and libraries into a software executable. To leverage existing software products, the software build may include the source code for the software application, along with additional applications, libraries, plug-ins, and/or other software modules that are introduced as part of the build process. These other software products are typically downloaded or otherwise received in an executable format from third-party software vendors. The functionality of these other software modules can then be incorporated by the build process into the software application itself. This allows for code reuse and reduces development time for software applications.

Many of these software modules that are introduced during the build process may be referred to as "third-party" software modules. These can be distinguished from the main source code of the software application. For example, the main source code may be developed by a team of software developers for a particular entity. The third-party software modules may be sourced from other entities or other development teams that are separate and distinct from those that develop the main source code. For example, software developers may download software libraries or plug-ins, such as software development kits (SDKs), from online repositories that have been developed by completely separate software development teams for different companies. These third-party software modules may then be integrated as part of the build process to import their functionality into the software application. Similarly, a fourth-party software module may be linked to the third-party software module through a similar build process. Fifth-party software modules may be linked through the build process for the fourth-party software modules, and so forth. At each stage N, it is possible that N+1$^{th}$-party software may be modules used in the build process for the module(s) of stage N, and these software modules may be developed by separate and distinct development teams (e.g., software development teams that work for different employers, software applications that are maintained and distributed by different companies, software modules that are available as open-source online, etc.).

FIG. 1 illustrates a software build pipeline 100 for software applications, according to some embodiments. A main build environment 102 may include executable software code that is configured to receive main source code 108 for a software application 116. The main build environment 102 may also receive third-party software modules 110, 120 that have been pre-compiled prior to executing the build code of the main build environment 102. For example, a software module 110 may be compiled into a library, .jar file, application, plug-in, or other form of executable code may be received from a third party. The third party may include a separate software development team that is distinct from a software development team executing the main build environment 102 and/or authoring the main source code 108.

The software module 110 may in turn be generated by a third-party build environment 104 that operates in a similar fashion to the main build environment 102. For example, the third-party build environment 104 may include third-party source code 112 and one or more fourth-party software modules. The fourth-party software modules may also include pre-compiled executables that are included in the third-party build environment 104. For example, a software module 114 may be compiled from what is referred to herein as a "fourth-party build environment," which may itself be linked to fifth-party software modules, and so forth. The third-party build environment 104 may be executed a separate location at a time prior to the execution of the main build environment 102. For example, a first company may compile a software library at the third-party build environment 104 using a first computer system and make the resulting executable software module available online. The resulting executable software module may be imported as the third-party software module 110 in the main build environment 102 at a later time and included in the software application 116 when the main source code 108 is compiled. The main build environment 102 may be executed at a second computer system that is separate and distinct from the first computer system.

An unlimited number of different build environments may form dependencies in the software build pipeline 100. For example, the main build environment 102 may link to a plurality of third-party software modules, including software module 110, software module 120, and/or other third-party software modules not shown explicitly in FIG. 1. Each of these software modules 110, 120 may be included in build environment dependencies that span back N generations. The dependencies for software module 110 may span back to the N$^{th}$-party build environment 124, which only depends on the N$^{th}$-party source code 122 to provide the compiled software module 126 to the N−1$^{th}$-party build environment 106. Therefore, it should be understood that the number of dependencies and the number of build environments illustrated in FIG. 1 is provided only by way of example and is not meant to be limiting. Many other build dependencies may be present that are not shown explicitly in FIG. 1 for the sake of clarity.

There are number of technical problems associated with simply including or linking a compiled software module into the main build environment 102. First, the software developers for the software application 116 may need to rely on the documentation and representations of the third-party software developer(s) to ensure that the code functions properly and as expected. These third-party software developers may in turn be relying on the documentation and representations of the fourth-party software developers, and so forth. The embodiments described herein solve this technical problem by using an automated, nested build environment that explores the dependencies between each of the software modules in the build pipeline 100 and allows the main build environment 102 to compile the source code for each software module on which the main source code 108 depends. This allows software developers for the software application 116 to use the existing, un-compiled source code to verify functional requirements, ensure licensing standards are met, ensure coding standards are met, evaluate security standards that may be required by the software application 116, and so forth. This also allows the compilation of the main source code 108 and the execution of the main build environment 102 to be repeatable and predictable over time. Because the source code is included as part of the main build environment 102 for any third-party, fourth-party, etc. dependencies, all of the code can be stress tested and debugged at every level. In short, these embodiments allow the software application 116 to be "built from scratch" in the main build environment 102 rather than relying on any third-party build environments 104 to ensure that requirements are met.

Figure 2:
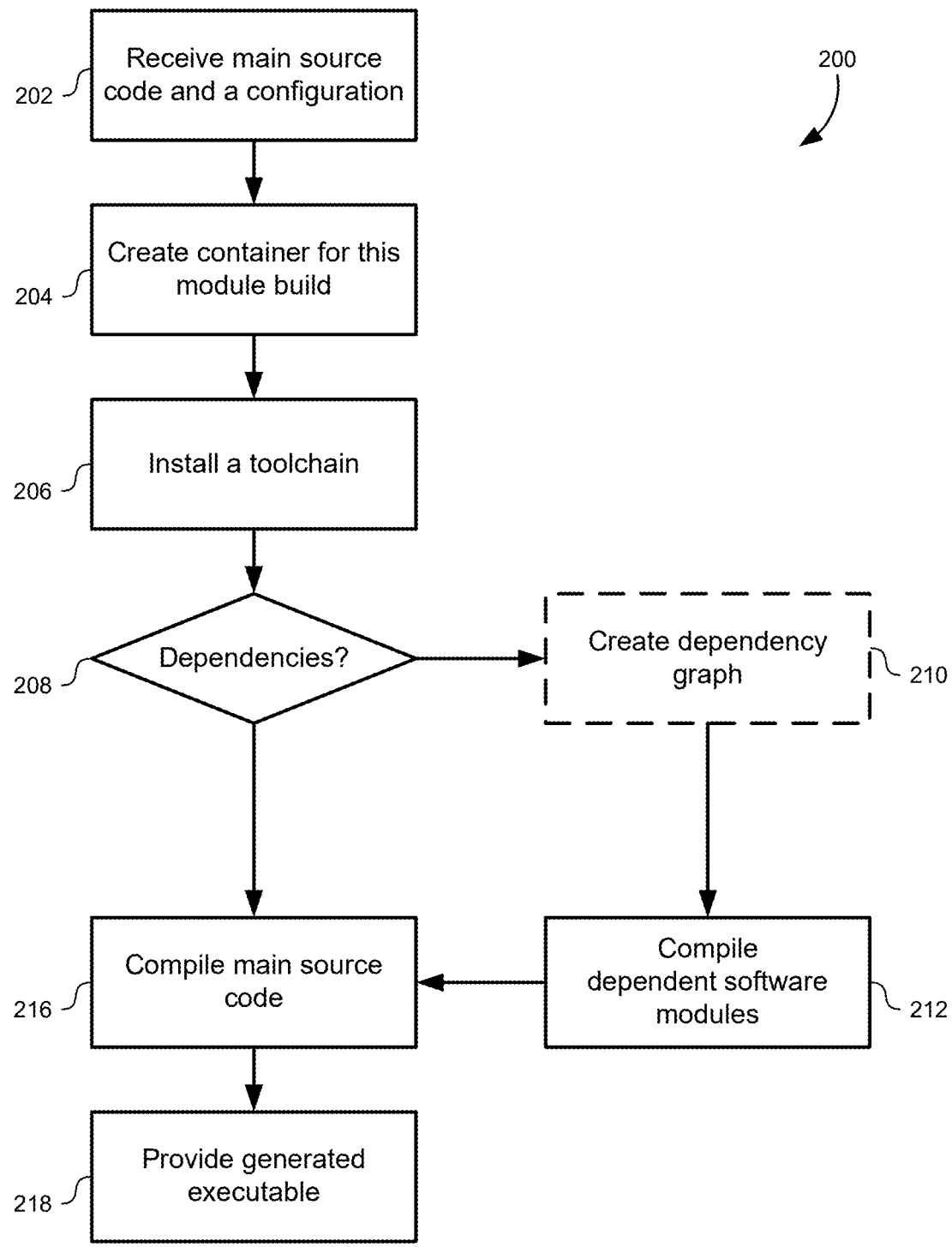
FIG. 2 illustrates a flowchart of a method for performing a nested build operation for software dependencies, according to some embodiments.

FIG. 2 illustrates a flowchart 200 of a method for performing a nested build operation for software dependencies, according to some embodiments. This method may begin with main source code for a software application that is compiled in a container. As dependencies are discovered for third-party software modules, fourth-party software modules, and so forth, new containers may be instantiated and populated with the necessary toolchains and source code files. These new containers can be processed in parallel to build the third-party, fourth-party, etc., software modules, which may then be passed up the dependency chain to each dependent container. This process may be carried out iteratively or recursively until all of the third-party software modules have been built for the software application. The main container may then compile the main source code and build the software application.

The method may include receiving main source code and a configuration (202). The main source code may include one or more source code files that are developed for the software application. For example, a software development team may program the main source code and provide the main source code to the build process when building the software application. The main source code may also include one or more in-house libraries or pre-compiled software modules developed by the same software development team or entity as the main source code. The configuration file may include instructions that define how the build environment should be set up to execute the build process for the software application. For example, the configuration file may include instructions that determine how the build pipeline flow should be executed. In some embodiments, the configuration file may also define dependencies, toolchains, programming languages, build options, and/or other information used during the build process.

The method may also include creating a container to build the software application (204). The container may include a Docker-style software container in a container platform. The container may be populated with an operating system, a configuration, build logic, and/or other utilities that may be used to compile the main source code and link any third-party software modules. To distinguish this container from other containers, the main container may be referred to as a "first" container, while other containers described below may be referred to as "second" containers, "third" containers, and so forth. Note that the first/second/third/etc., descriptors are used only to distinguish one container from another container. These descriptors do not imply order, precedence, importance, or any other feature of the corresponding containers.

The method may further include installing a toolchain (206) in the container. As used herein, the term toolchain may refer to a low-level tool or execution environment for building, compiling, and packaging the software application. For example, JAVA may be part of a toolchain for JAVA-based projects. C++ projects may use the standard C libraries as part of the toolchain. A toolchain may also include a build utility, such as make, Maven, or Gradle. The different utilities that are part of the toolchain may be determined based on a number of different factors. For example, utilities in the toolchain may be identified by virtue of a source code file extension (e.g., ".java"). Some embodiments may identify utilities in the toolchain by retrieving settings from a source code build file. Some embodiments may parse and analyze documentation provided by an original developer of the source code to identify utilities that may be used to build the software application. Some embodiments may also retrieve, parse, digest, and/or otherwise analyze failed build logs to identify utilities that may be required as part of the toolchain to build the software application (e.g., to identify missing toolchain utilities in previous builds). In some embodiments, the toolchain utilities may be identified and used to build the configuration file, such that the configuration file lists the utilities in the toolchain. To install the toolchain, some embodiments may first install a YUM repository, then install the toolchain from the YUM repository.

The method may additionally include identifying any dependencies for the software application (208). At this stage, any third-party software modules upon which the software application depends may be identified. These third-party software modules may be identified in the configuration as being linked to the software application during the build process. However, instead of simply importing compiled libraries or executables from a download site or other repository, the embodiments described herein may generate a recursive or iterative process that builds each of these third-party software modules during this build process. Identifying third-party software modules dependencies may be distinguished from identifying dependencies on software modules that are developed in-house or by the same development team.

As described above, the third-party software modules may also include dependencies on fourth-party software modules, and so forth without limitation. Some embodiments may therefore create a dependency graph (210) of software dependencies at each level. Some embodiments may recursively traverse each software dependency in order to discover software dependencies at a lower level. For example, for each dependency on a third-party software module, the method may perform a similar operation on that third-party software module to identify a list of fourth-party software modules upon which the third-party software module depends. This may be carried out for each third-party software module. Then, the same process may be repeated for each fourth-party software module and so forth.

Figure 3:
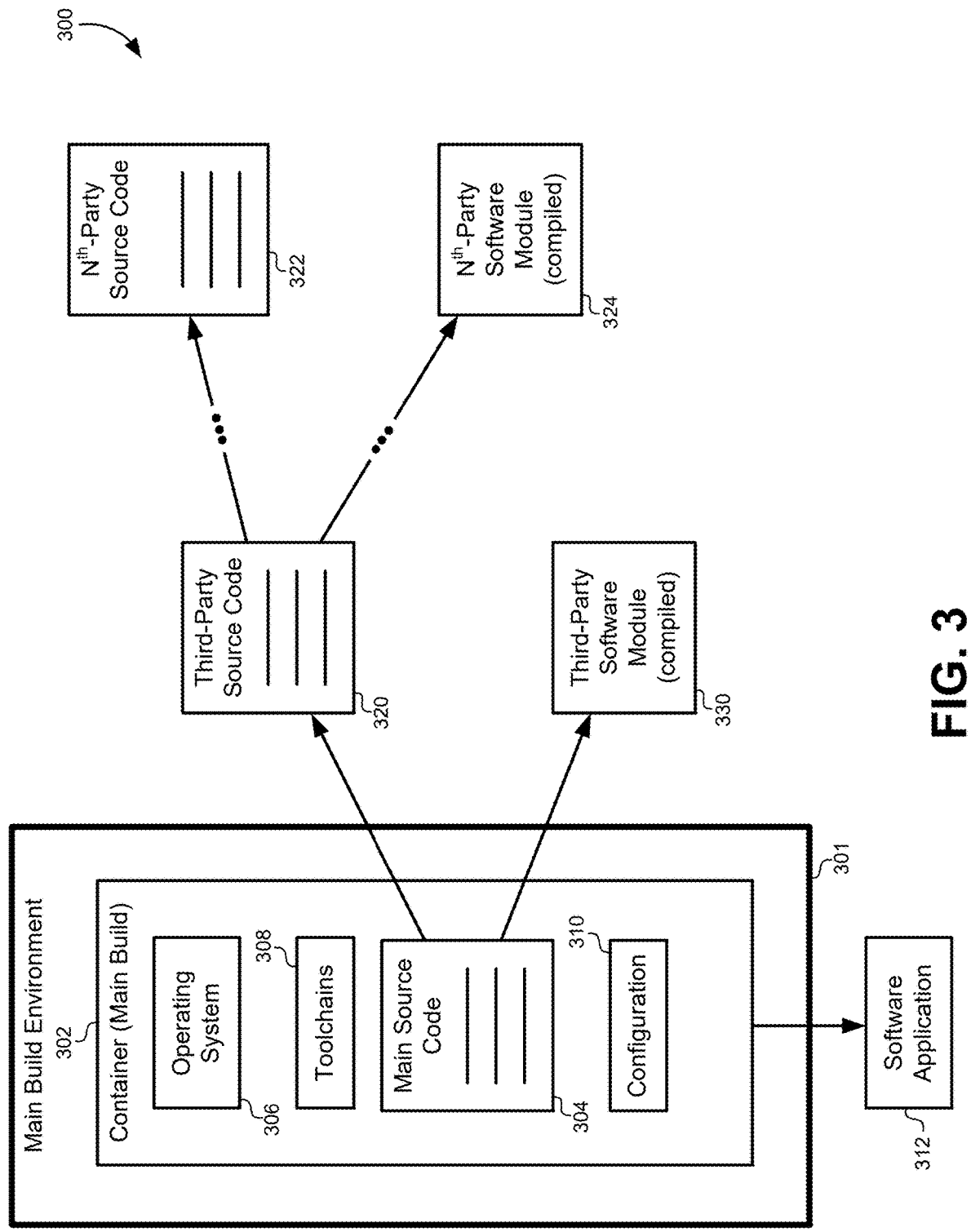
FIG. 3 illustrates a dependency graph, according to some embodiments.

FIG. 3 illustrates a dependency graph 300, according to some embodiments. The main build environment 301 may include a main container 302 (also referred to as a "first" container) that is instantiated to build the software application 312. The main source code 304 may be imported into the main container 302. An operating system 306 may be installed with any required toolchains 308 as described above. The configuration 310 may also be stored in the main container 302 with instructions for executing the build process. The dependency on the third-party software modules 320, 330 may be discovered by parsing the main source code 304 and discovering references to the third-party software modules 320, 330. Alternatively, these dependencies may be discovered by identifying references to the third-party software modules 320, 330 in the configuration 310.

Each of the discovered dependencies in the third-party software modules 320, 330 may be traversed recursively or iteratively to identify further software dependencies. This operation may continue through each dependency branch until either (1) no additional software dependencies are discovered, or (2) source code for a dependency is not available. For example, the source code for third-party software module 330 may not be available. This determination may be made by querying a local repository that stores source code and/or compiled executables, as described below in FIG. 4. After determining that the source code for the third-party software module 330 is not available, the main build environment 301 may import the compiled executable for the third-party software module 330 into the main container 302. Generically, the executable from the built or compiled third-party software module 330 may be referred to as an "artifact" that is imported or uploaded to the main container 302. No additional dependencies may stem from the third-party software module 330 since it is already in an executable form.

In contrast, third-party software module 320 may have un-compiled source code that is available. As described below, the source code for the third-party software module 320 may be verified, tested, debugged, or otherwise validated for use in the software application 312 before it is built. Therefore, the same process described above may be carried out for the third-party software module 320 to identify any fourth-party software modules upon which the third-party software module 320 depends. This process may continue down this dependency branch until a software module is identified that has no additional dependencies (e.g., software module 322) or until a software module is identified for which source code is not available but for which a compiled executable is available (e.g., software module 324).

The dependency graph 300 is illustrated functionally in FIG. 3. However, this dependency graph 300 may be stored in a data structure as it is constructed by traversing the dependencies as they are discovered as described above in flowchart 200. The data structure for the dependency graph 300 may include a graph data structure with nodes and edges, a linked list, and/or any other data structure that may be used to store a graph of relationships between objects.

Turning back to FIG. 2, the method may additionally include compiling the dependent software modules (212). After dependencies are identified, a new container may be generated or instantiated for each dependent software module. Using the same process described above for the main container, each of these dependent containers may include corresponding toolchains, source code files, operating systems, utilities, and/or configurations that may be used to efficiently build each of the dependent software modules. "Spinning up" new containers for each dependent software module allows the build process for each software module to be individualized. As described below, software modules may use many different programming languages, build environments, libraries, utilities, and so forth. One of the technical advantages provided by these embodiments is that each of these individual software modules may be built according to their own specifications rather than being forced into the same container or as a parent build. These containers effectively separate the different builds for each of the different dependent software modules.

These containers also allow the build processes for each of the software modules to be carried out in parallel in the container environment. As illustrated in FIG. 3, dependencies may be identified and resolved recursively. For example, a dependency branch may be explored until a base-level software module is identified through recursive function calls. Some embodiments may execute the method of flowchart 200 for each dependency level. When a software modules at the end of a dependency is reached, a container for that software module may be instantiated (referred to as a "second" container to distinguish from a "first" container of a parent software module). This container may then be populated with the configuration, toolchain, source code, etc., and the software module may be built. The resulting artifact or executable file may then be passed back to the parent software module that is dependent upon the executable file. Some embodiments may build all of the dependencies at a corresponding dependency level in parallel. As built executables are generated, they can be passed up the dependency graph and the dependent software modules may begin their build process as soon as all of the required executables have been received from lower dependency levels. Thus, the build for software module dependencies can be carried out largely in parallel to improve the overall build time used by the process to generate the top-level software application.

After all of the built/compiled executables for the software module dependencies have been received, the main container may compile the main source code using the configuration and any compiled software modules on which the main source code depends (216). The final executable may be provided (218). If the final executable represents the main software application, the process may come to a conclusion. If the final executable represents a dependent software module at a dependency level in the dependency graph, the executable may be provided as an artifact to a previous level in the dependency graph.

Figure 4:
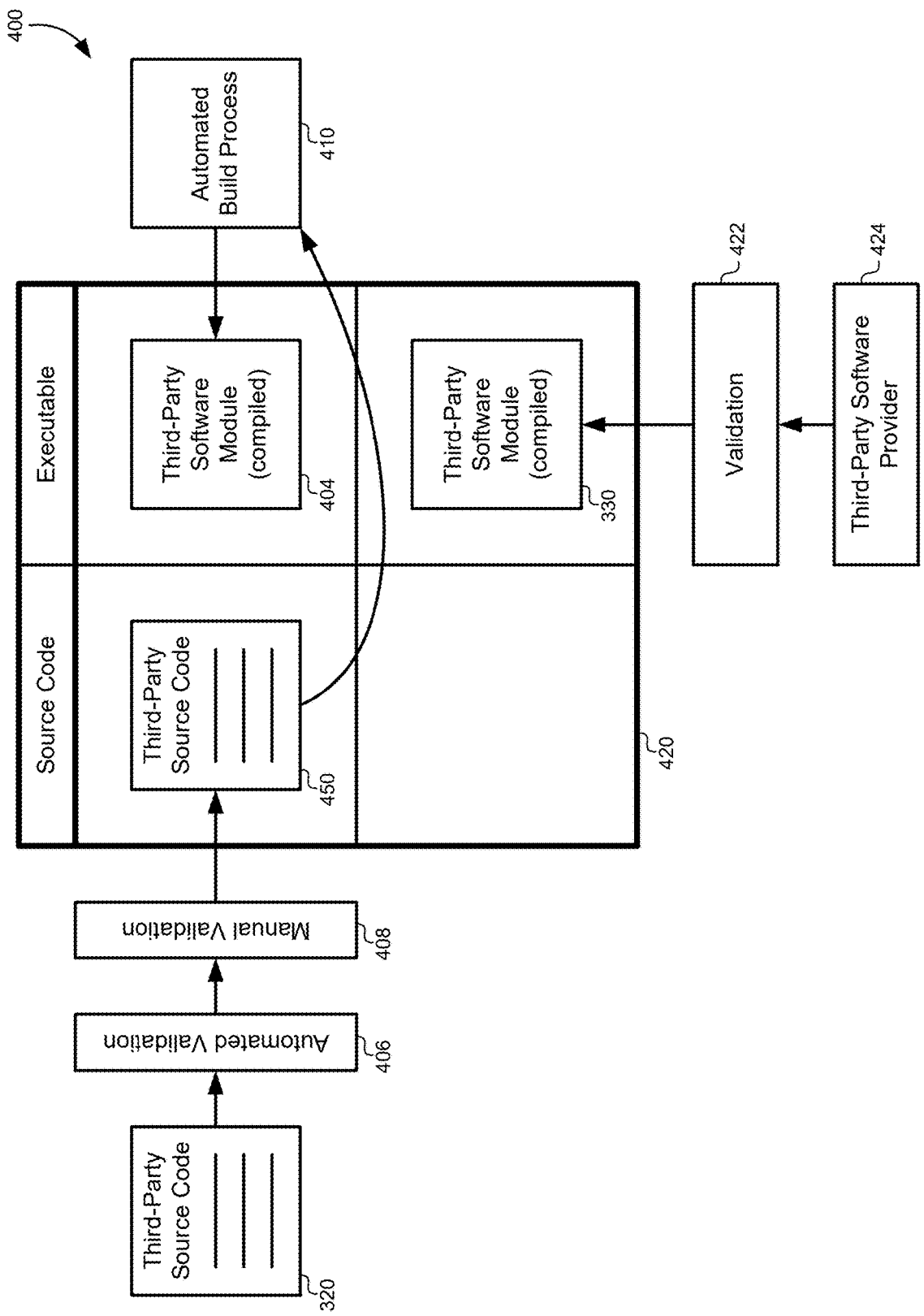
FIG. 4 illustrates a repository that may be used to store source code and/or executables, according to some embodiments.

FIG. 4 illustrates a repository that may be used to store source code and/or executables, according to some embodiments. One of the technical advantages provided by the embodiments described herein is the ability to validate third-party software modules before they are incorporated into a new software application. A repository 420 may be used to store third-party software code, verified third-party executables, and/or containers, configurations, or toolchains for building third-party software modules. This repository 420 may be used to retrieve source code that may be used to build additional software applications. The repository 420 allows software modules and source code to be reused without revalidation with each new software application.

Third-party source code 450 may be received from a third party that designs and/or distributes the third-party software module. The third-party source code 450 may be retrieved from an online repository, from the third-party itself, or from another source. The third-party source code 450 may be received in response to a current build of a software application that has a dependency on the third-party software module. For example, the main source code for a software application may reference the third-party software module. In response, the system may automatically query or generate a request for the third-party source code 450.

After receiving the third-party source code 450, the third-party source code 450 may be subjected to an automated validation procedure 406. This automated validation procedure may parse the third-party source code 450 to identify known source code types or instructions that may be malicious. Templates that identify code structures that should not be allowed in the software application may be applied against the third-party source code 450 to ensure that no malicious code is included in the software application. For example, code may be identified that transmits data to an unauthorized location. This allows the automated validation procedure 406 to enforce different source code security protocols on the source code to be used in different applications. Some embodiments may also allow a manual validation procedure 408 to be carried out before the third-party source code 450 is fully validated. The manual validation procedure 408 may include a review by a software developer. Other forms of automated validation may be carried out, such as debugging or fully testing each line of source code in the third-party source code 450.

Once the third-party source code 450 is fully validated, the third-party source code 450 may be stored in the repository 420. If the third-party source code 450 was retrieved in response to a current build request, the third-party source code 450 may also be provided to the build environment as described above. Thus, the repository 420 may store validated source code files for a number of different third-party software modules. Future requests need not again retrieve the third-party source code 450 from an external source, but may instead simply retrieve the third-party source code 450 from the repository 420. The repository 420 may also store and enforce version control, and may be implemented using, for example, a GIT repository.

As described above, the third-party software code 320 may be imported into its own container in as part of an automated build process 410 and compiled into an executable. The executable artifact from the build process for the third-party software module may then be imported into a parent container based on the dependency graph. Additionally, the executable artifact from a build process may also be uploaded to the repository 420 as a compiled third-party software module 404. Because the third-party software module 404 has been generated by a local automated build process 410 directly from the third-party source code 450, the third-party software module 404 may be considered validated and approved for use in the current software application, as well as in subsequent software applications.

For example, when a subsequent software application includes a dependency on the third-party software module 404, the automated build process 410 may retrieve the third-party software module 404 from the repository 420 for use in the automated build process 410. This eliminates the need for the automated build process 410 to recompile/build the third-party software code 320 unnecessarily. Note that some embodiments may include a setting that rebuilds the third-party software module 404 from the third-party source code 450 with each build. Additionally, some embodiments may invalidate the third-party software module 404 if any software modules or source code files upon which the third-party software module 404 depends are changed between builds. Therefore, the repository 420 may ensure that the third-party software module 404 is fully validated if used in its compiled executable form in build processes for subsequent software applications.

As described above, some third-party software modules may not make their source code available. In these instances, the automated build process 410 may instead use a compiled version of the third-party software module as an alternative. Some embodiments may retrieve a compiled third-party software module 330 from a third-party software provider 424 by download, purchase, open-source, and/or other software distribution channels. Some embodiments may also test or otherwise perform a validation process 422 on the third-party software module 330 before it is used in any software applications. For example, the third-party software module 330 may be executed in an isolated environment to ensure that it performs as expected/documented before placing it in the repository 420. When the automated build process 410 calls for the third-party software module 330, the third-party software module 330 may be retrieved from the repository 420 in the validated configuration instead of retrieving a new, possibly dangerous executable from the third-party software provider 424.

Although not shown explicitly in FIG. 4, the repository 420 may also store container images, configurations, toolchains, and/or other utilities that are used during the build process for each third-party software module. When the third-party source code 450 is retrieved from the repository 420, the stored containers, configurations, toolchains, and/or other utilities may also be retrieved from the repository 420 and reused to rebuild the third-party software module 404. This increases the efficiency with which the automated build process 410 can recompile the third-party software module 404 directly from the third-party source code 450 when needed.

Figure 5:
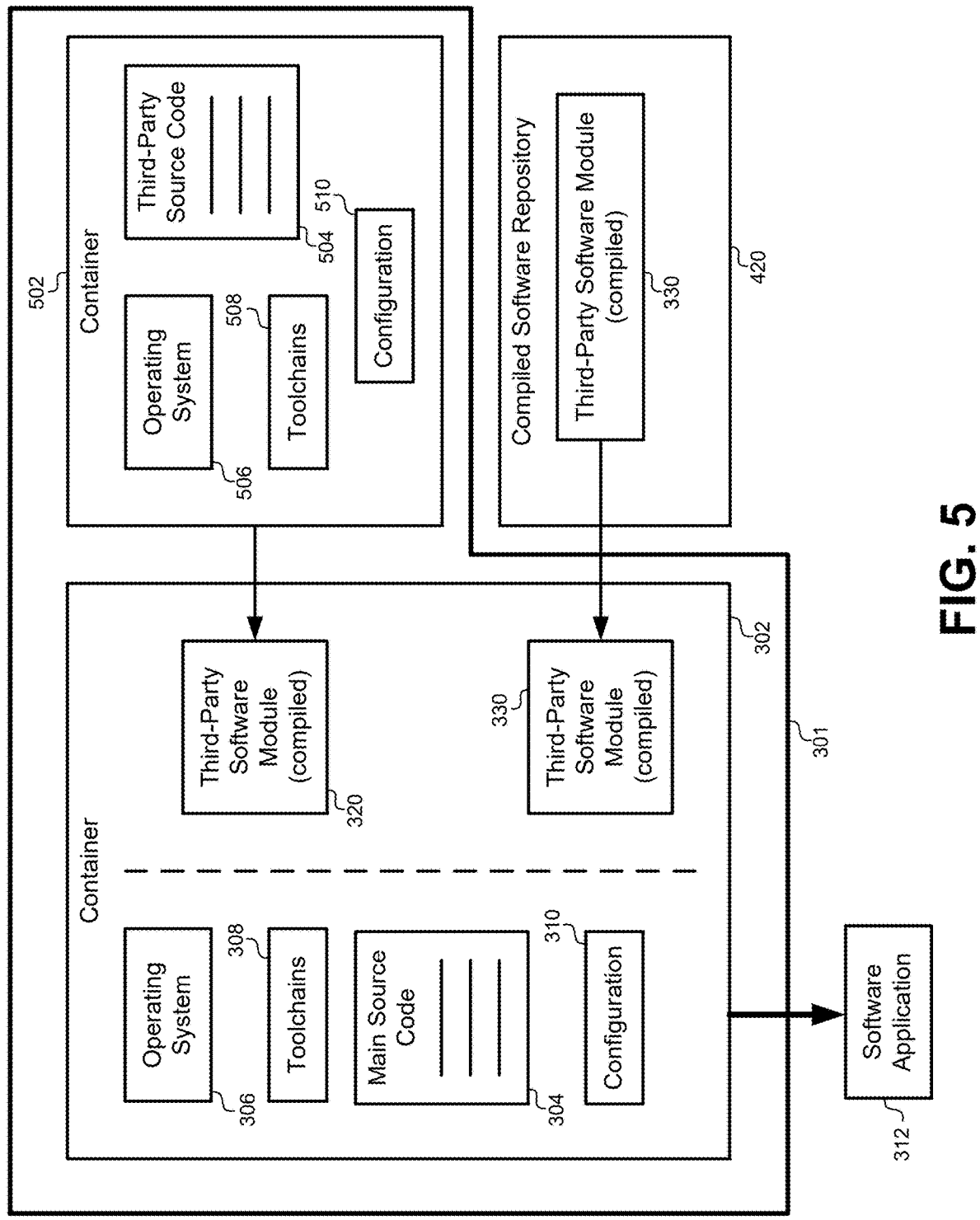
FIG. 5 illustrates a block diagram of a main build environment, according to some embodiments.

FIG. 5 illustrates a block diagram of a main build environment 301, according to some embodiments. This diagram illustrates how new containers can be instantiated and added to the main build environment 301. This diagram also illustrates how compiled software modules from the repository 420 can be imported into a container during the build process.

As described above, a main container 302 (or "first" container) may include an operating system 306, a configuration 310, installed toolchains 308, main source code 304, and/or other utilities. The main container 302 and identify that the main source code 304 depends on two third-party software modules 320, 330. A determination may be made that third-party software module 330 does not have available source code that can be compiled during this build process. However, the repository 420 may have stored an executable version of the third-party software module 330 that has been verified, and which can be imported into the main container 302.

Third-party software module 320 may have source code available. This third-party source code 504 may be downloaded, verified, and provided to the main build environment 301. Alternatively, the third-party source code 504 may be retrieved from the repository 420 if it has been previously downloaded, verified, and so forth. Assuming that the repository 420 does not also have an executable version of the third-party software module 320, the main build environment 301 may instead build the third-party software module 320 from the third-party source code 504 as part of the same build process for the software application 312.

For example, a new container 502 (or "second" container) may be generated. The new container 502 may be generated from scratch as a new container, and the operating system 506, toolchains 508, configuration 510, and/or other utilities may be loaded into the new container 502. Alternatively, the new container 502 may be loaded from the repository 420 as used in a previous build from a stored container image. The new container 502 may use the operating system 506, toolchains, 508, configuration 510, and other utilities already stored in the new container 502 from the previous build. The new container 502 may execute a build process according to the configuration 510 to generate the third-party software module 320. The third-party software module 320 may then be uploaded or imported as an artifact to the main container 302. When both of the third-party software modules 320, 330 have been imported into the main container 302, the main container may execute its build process according to the configuration 310 to generate software application 312. Additionally, after generating the third-party software module 320, a copy of the executable artifact may also be uploaded to the repository 420 to be reused in future builds involving the third-party software module 320.

Figure 6:
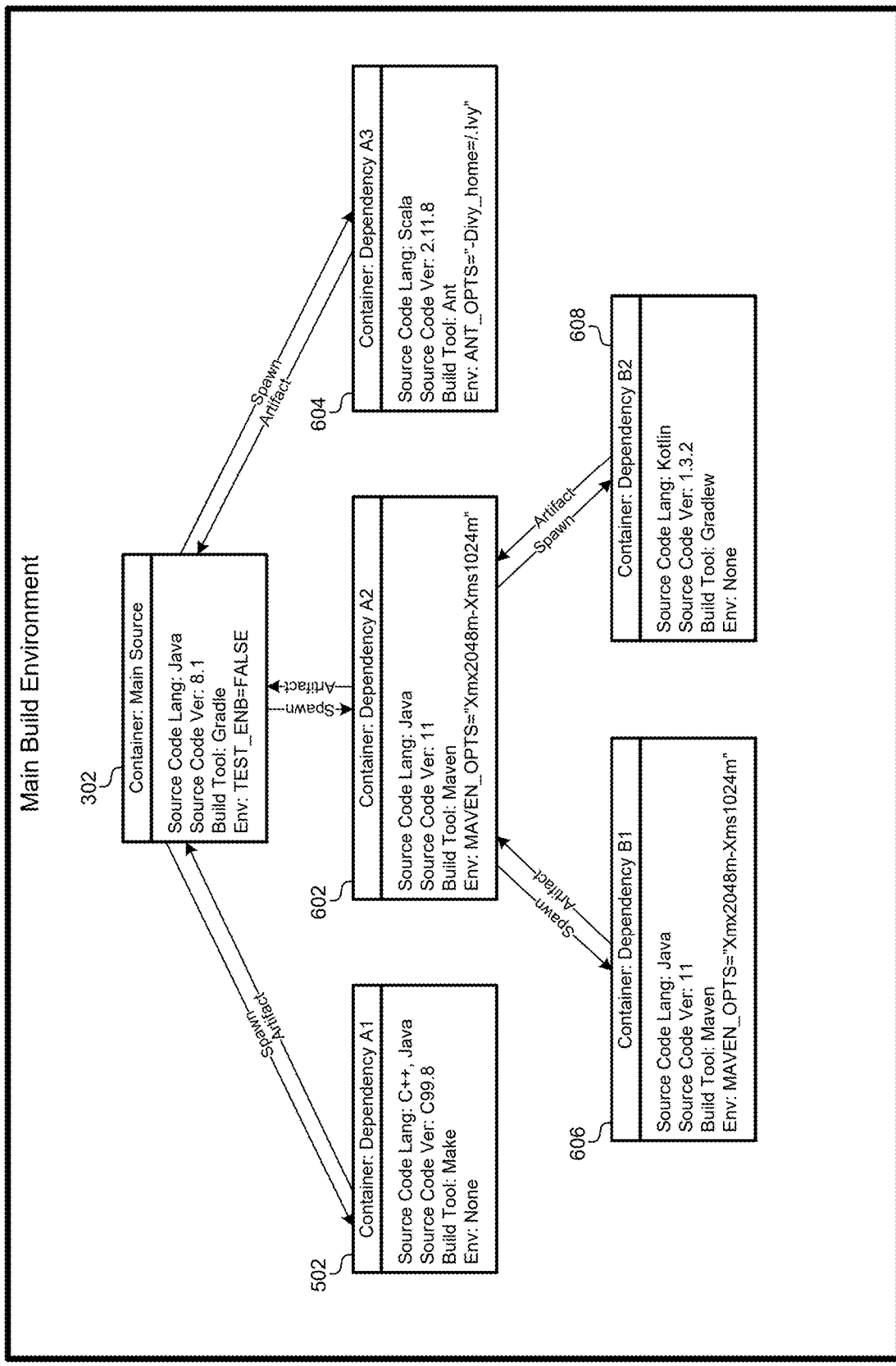
FIG. 6 illustrates multiple levels of spawned containers used to build dependent software modules in the main build environment, according to some embodiments.

FIG. 6 illustrates multiple levels of spawned containers used to build dependent software modules in the main build environment, according to some embodiments. Note that when the build process begins, the main build environment 301 only needs to include the main container 302. As dependencies are discovered, new containers may be generated in the main build environment 301 for each software module that should be built and upon which the main source code depends. This may be done by identifying a list of dependencies, and iterating through that list of dependencies down recursive paths. For example, container 502 may be generated first as the first dependency in the dependency list. Next, container 602 may be generated followed by container 606 and container 608. Finally, container 604 may be generated.

Note that each container may be populated with specific utilities used to efficiently build each individual software module. For example, a language for the software module source code may be identified along with a source code version. The build process for each individual software module may also use different build tools in their respective toolchains, such as make, Maven, Gradle, and so forth. Different environment variables may be set by the configuration used to execute the build process in each dependent container as illustrated in the example shown in FIG. 6.

Note that the build processes for each of the dependency containers may be executed using various degrees of parallel processing. Some embodiments may build all containers at a certain dependency level in parallel. For example, containers 606, 608 may be built first in parallel, followed by containers 502, 602, 604 in parallel, and so forth. Some embodiments may build all containers that reside as end nodes in the dependency graph in parallel. For example, containers 502, 606, 608, 604 may all be built in parallel. This parallel execution of build processes reduces the overhead and processing time required to build each of the dependency software modules from their respective source codes.

Figure 7:
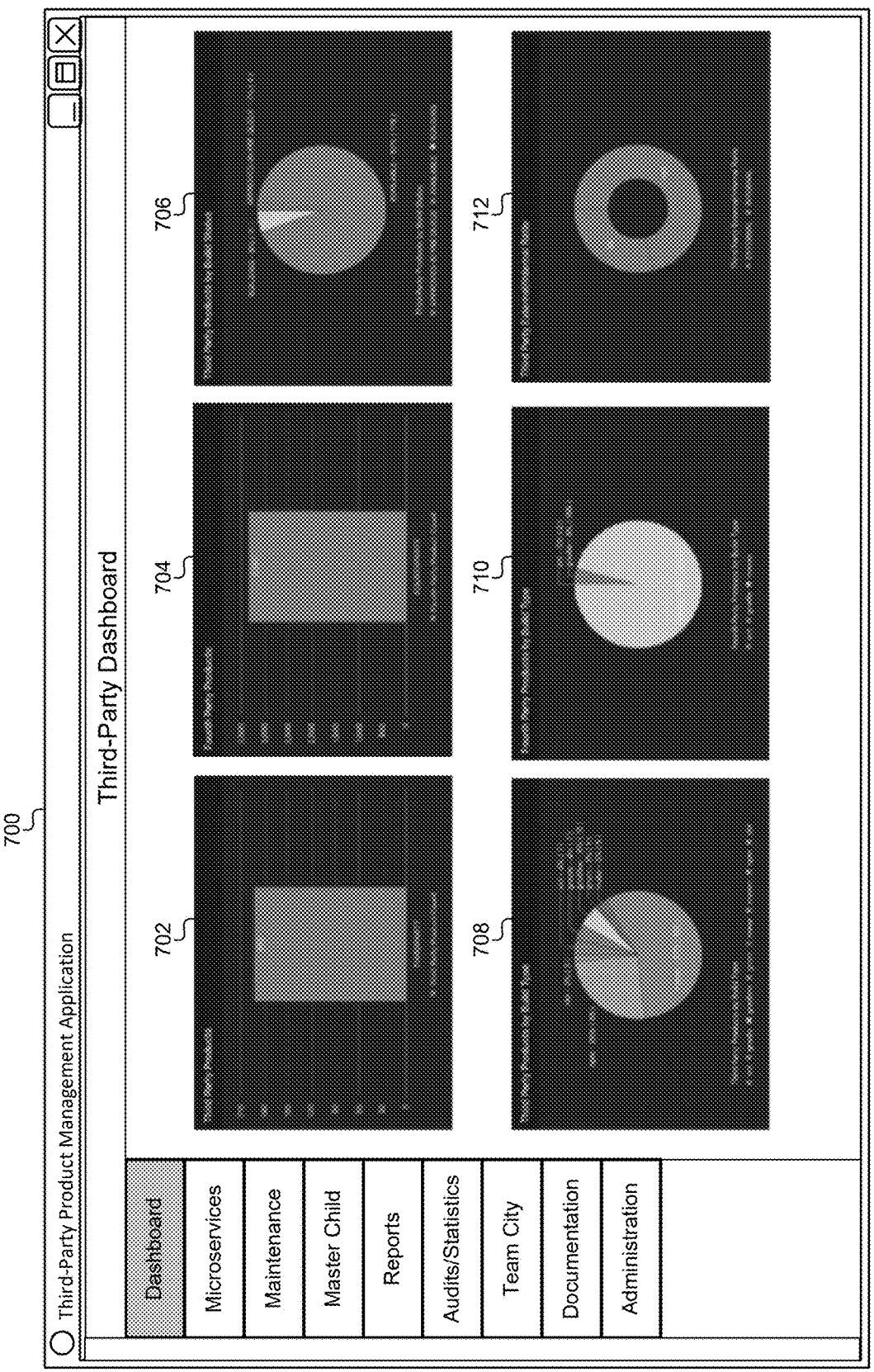
FIG. 7 illustrates a graphical user interface (GUI) that may be used to monitor software application builds and third-party modules handled by the system, according to some embodiments.

FIG. 7 illustrates a graphical user interface (GUI) that may be used to monitor software application builds and third-party modules handled by the system, according to some embodiments. This particular GUI 700 illustrates a dashboard application that monitors third-party software modules that are available and used in a build process. For example, output 702 may illustrate a number of third-party software modules that have been built from source code that are available in the repository. Similarly, output 704 may illustrate a number of fourth-party software modules that have been built from source code or that are otherwise available to the build process. Output 706 illustrates a real-time status of third-party software modules that are being built as part of the build process. This may include a number of third-party software modules that have been approved and are waiting in a build queue, a number that have already been built and are available, and/or a number of third-party software modules that are currently being built in parallel. Output 708 may illustrate different types of third-party software modules organized by build type. For example, build types may include Maven builds, Gradle builds, make builds, and so forth. Similarly, output 710 may illustrate fourth-party software modules organized by build type. Output 712 may illustrate a ratio of third-party software modules that have been built internally versus third-party software modules that have been downloaded externally as executables.

This GUI 700 may be updated in real-time as a build process progresses and may also be available after a build process is complete. The GUI 700 may also be part of a larger third-party module management application. The management application may also allow users to explore the repository 420 to inspect source code and/or software modules that have been downloaded and verified. The application may also include documentation for the third-party software modules, as well as reports and logs on module usage over time.

Figure 8:
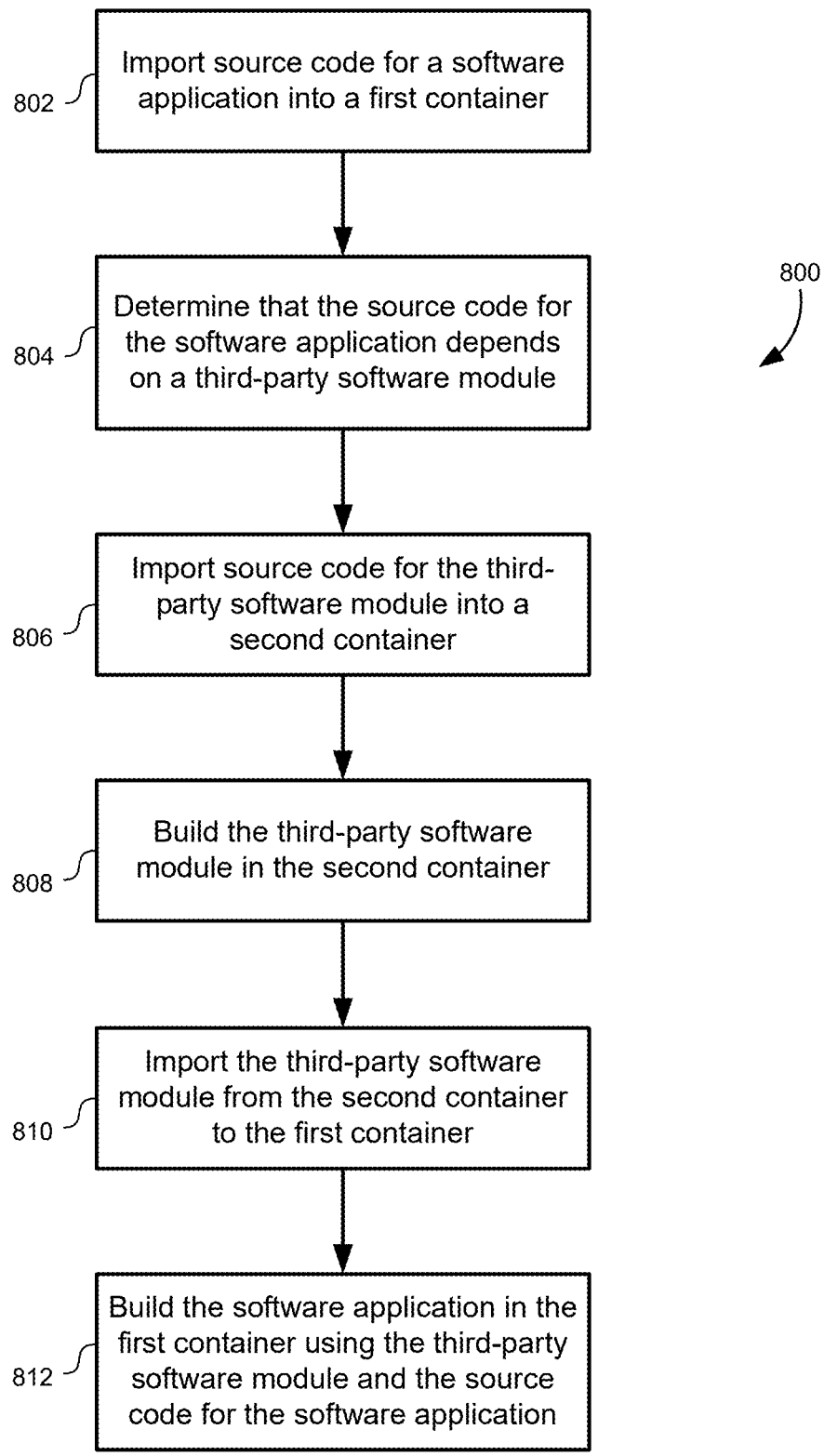
FIG. 8 illustrates a flowchart of a method of performing nested build operations for software applications with dependencies, according to some embodiments.

FIG. 8 illustrates a flowchart 800 of a method of performing nested build operations for software applications with dependencies, according to some embodiments. The method may include importing source code for a software application into a first container (802). The first container may be generated in order to build the software application as part of the build process. For example, the first container may be implemented using the "main container" described above. Alternatively, the first container may include source code for any software module in a nested build operation at any level. Thus, this method may be carried out at each individual level of a software build process, including a main or initial level. The first container may include a configuration that includes instructions for performing the build operation in the first container. The first container may also include a toolchain that is based on a programming language used by the source code.

The method may also include determining that the source code for the software application depends on a third-party software module (804). This determination may be made by parsing the source code for the software application and identifying references to third-party software modules. Dependencies may also be identified in a configuration for the build. Additionally, more than one third-party software module may be identified upon which the source code for the software application depends.

The method may additionally include importing source code for the third-party software module into a second container (806). Note that the "third-party" may be substituted with a "fourth-party," etc., if this method is carried out at a nested dependency level within the dependency graph in the build environment. The source code may be imported from a provider of the third-party software module. The source code may also be retrieved from a repository that stores verified, validated, tested, and/or otherwise approved versions of the source code to be used in automated build processes. The second container may be a separate and distinct container, such as a Docker container in a containerized environment. The second container may be generated new as part of the build environment. Alternatively, the second container may be retrieved from the repository and reused from a previous build. The second container may also include a configuration, an operating system, toolchains, and other utilities that are specifically used to build the third-party software module, and which may be entirely different from any configuration, toolchains, operating systems, utilities, etc., used by the first container. For example, a programming language of the third-party source code may be analyzed to determine the toolchains used in the container, each of which may be different from the programming language used in the first container.

The method may further include building the third-party software module in the second container (808). The build process for the third-party software module in the second container may be executed according to a configuration in the second container. If a plurality of third-party software modules are identified, additional containers may be generated and each of these third-party software modules may be built in their corresponding individual containers in parallel fashion. As described above, some third-party software modules may be available in the repository in a pre-compiled, executable form. These third-party software modules may be imported into the parent container for the parent build process without necessarily requiring these modules to be built again from the source code.

The method may additionally include importing the third-party software module from the second container to the first container. As described above, this third-party software module may be uploaded as an artifact from the second container at the completion of the build process for the third-party software module. Other third-party software modules may be uploaded or imported from the repository if they are already compiled in a validated state. The method may then build the software application in the first container using the third-party software module and the source code for the software application (812). In some embodiments, the first container and/or second container may then be destroyed and removed from the container environment. Some embodiments may also store these container images in the repository for reuse if the software application or the third-party software module are subsequently rebuilt. For example, a Docker image may be reused instead of being rebuilt during a later build.

It should be appreciated that the specific steps illustrated in FIG. 8 provide particular methods of performing nested build operation for software applications with dependencies according to various embodiments. Other sequences of steps may also be performed according to alternative embodiments. For example, alternative embodiments may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 9:
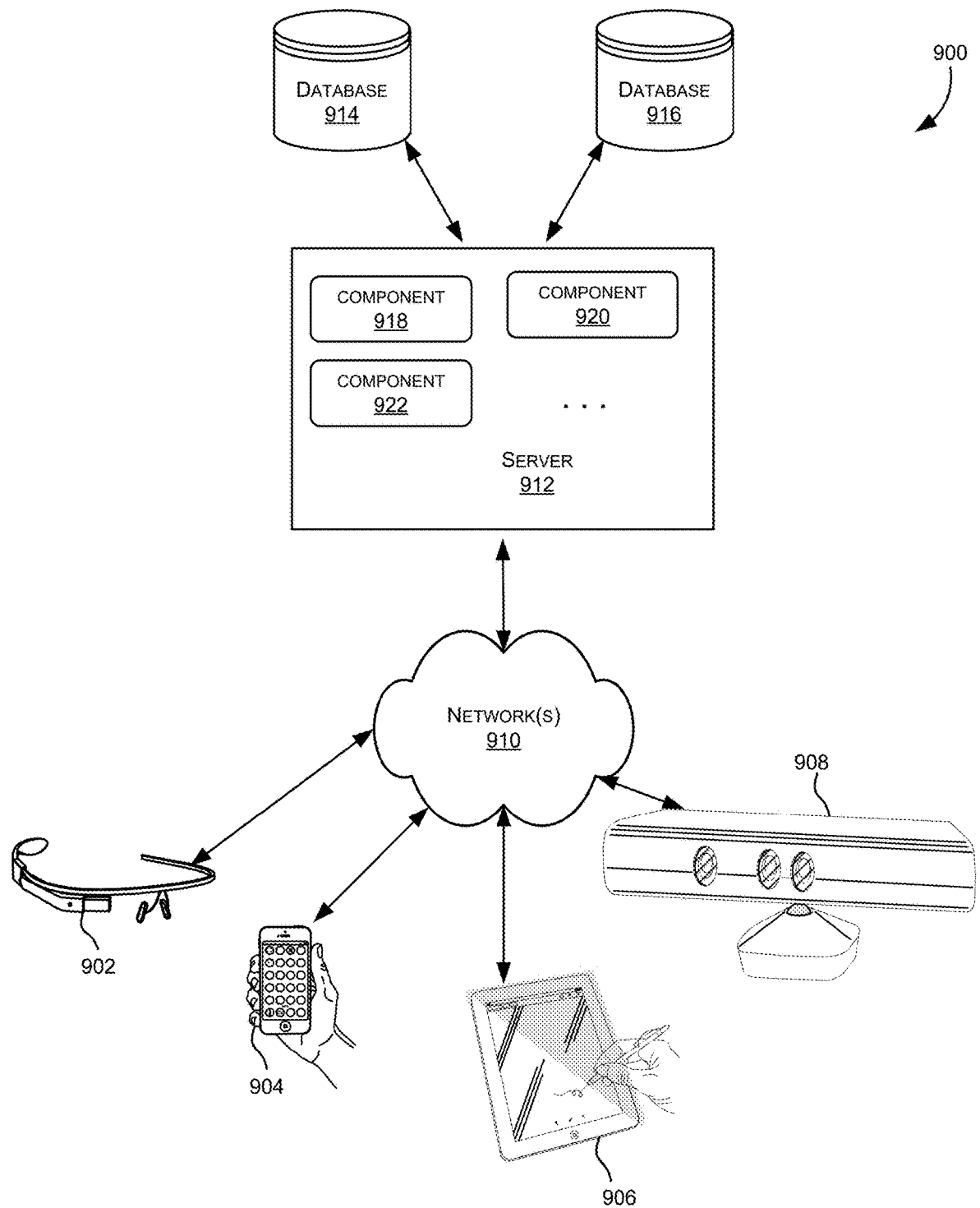
FIG. 9 illustrates a simplified block diagram of a distributed system for implementing some of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
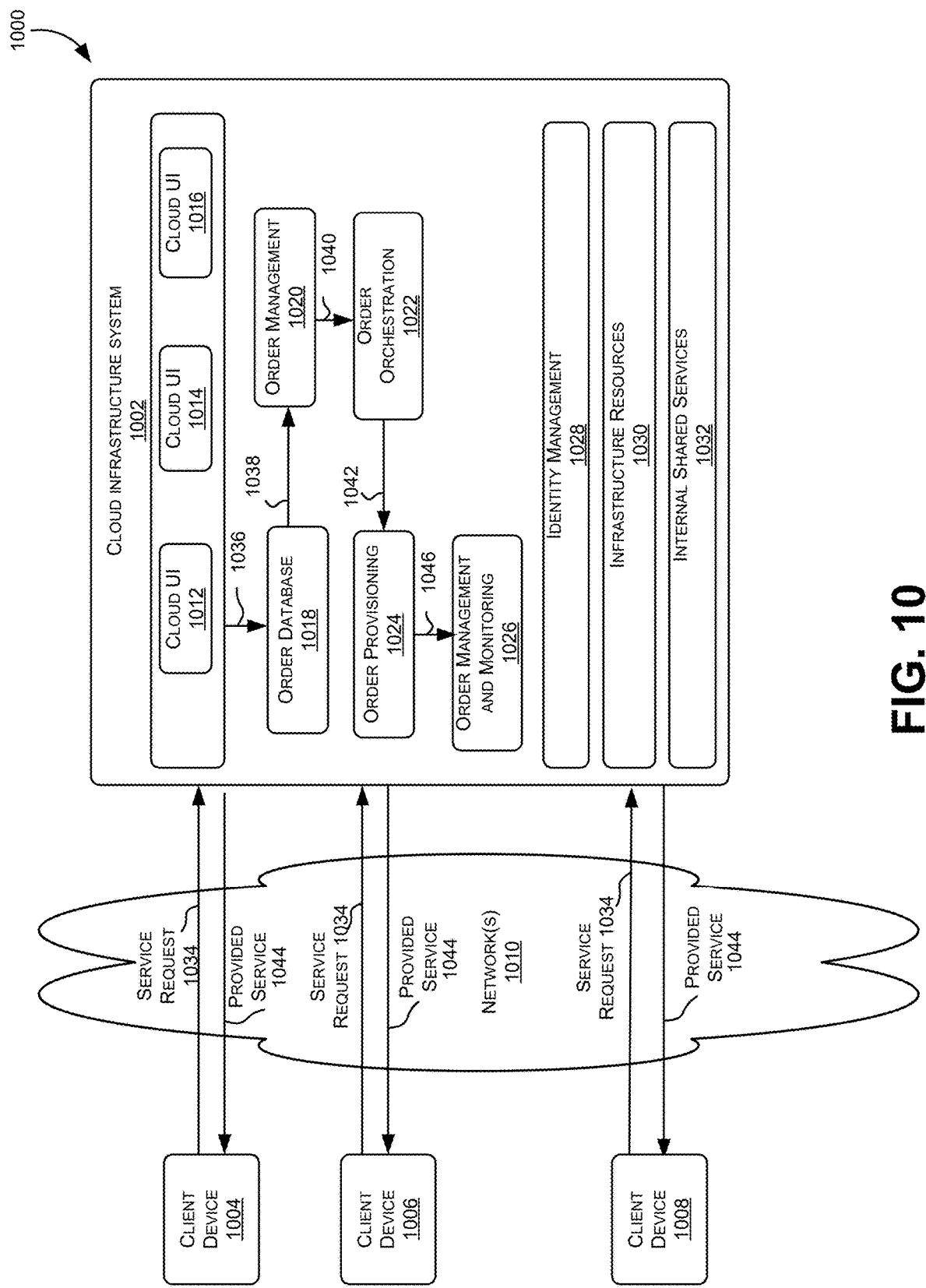
FIG. 10 illustrates a simplified block diagram of components of a system environment by which services provided by the components of an embodiment system may be offered as cloud services.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the system shown in the figure is only one example of a cloud infrastructure system that may incorporate some embodiments. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
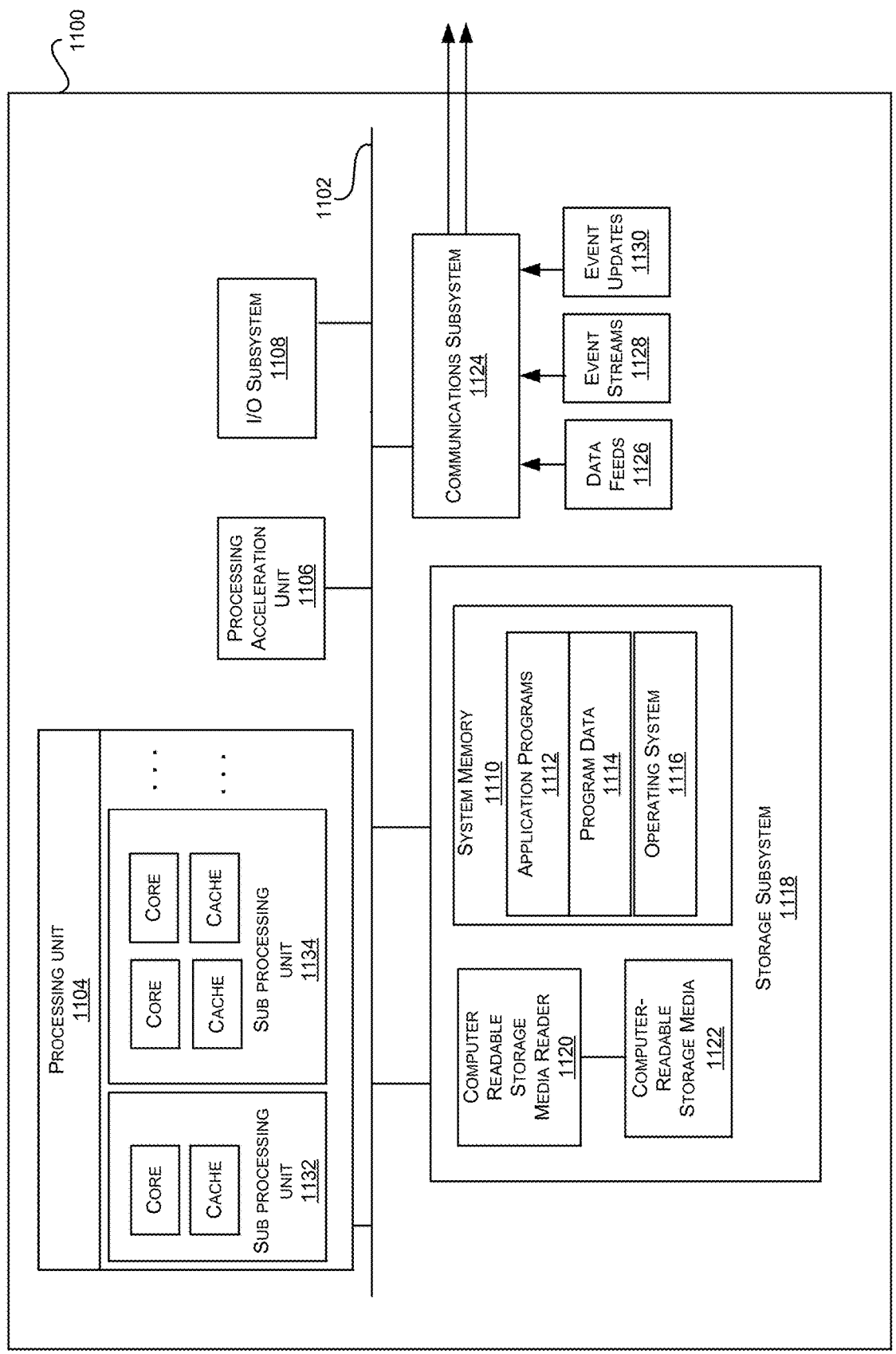
FIG. 11 illustrates an exemplary computer system, in which various embodiments may be implemented.

FIG. 11 illustrates an exemplary computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with some embodiments.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of performing nested build operations for software dependencies, the method comprising:
    importing source code for a software application into a first container in which to build the software application as part of a build process;
    determining that the source code for the software application depends on a third-party software module;
    importing source code for the third-party software module into a second container;
    building the third-party software module in the second container;
    importing the third-party software module from the second container to the first container; and
    building the software application in the first container using the third-party software module and the source code for the software application.

2. The non-transitory computer-readable medium of claim 1, wherein the operations further comprise, after building the third-party software module in the second container:
    receiving the third-party software module from the second container; and
    storing the third-party software module in the repository for reuse and subsequent builds that are dependent on the third-party software module.

3. A non-transitory computer-readable medium comprising instructions that, when executed by one or more processors, cause the one or more processors to perform operations comprising:
    importing source code for a software application into a first container in which to build the software application as part of a build process;
    determining that the source code for the software application depends on a third-party software module;
    importing source code for the third-party software module into a second container;
    building the third-party software module in the second container;
    importing the third-party software module from the second container to the first container; and
    building the software application in the first container using the third-party software module and the source code for the software application.

4. The non-transitory computer-readable medium of claim 3, wherein the operations further comprise:
    determining that the source code for the software application depends on a plurality of third-party software modules that includes the third-party software module.

5. The non-transitory computer-readable medium of claim 3, wherein the second container comprises a toolchain that is based on a programming language used by the source code for the third-party software application that is different from a toolchain used by the first container.

6. The non-transitory computer-readable medium of claim 3, wherein the operations further comprise:
    generating a dependency graph of software modules upon which the third-party software module depends.

7. The non-transitory computer-readable medium of claim 6, wherein the dependency graph is generated by recursively evaluating the software modules on which the third-party software module depends.

8. The non-transitory computer-readable medium of claim 7, wherein the operations further comprise:
    importing source codes for the software modules on which the third-party software module depends into corresponding individual containers; and
    building the software modules on which the third-party software module depends in their corresponding individual containers.

9. The non-transitory computer-readable medium of claim 8, wherein the software modules on which the third-party software module depends are built in their corresponding individual containers in parallel.

10. The non-transitory computer-readable medium of claim 8, wherein the individual containers comprise toolchains for programming languages used by the corresponding software modules on which the third-party software depends.

11. The non-transitory computer-readable medium of claim 8, wherein the operations further comprise:
  importing the software modules on which the third-party software module depends into the second container, wherein building the third-party software module in the second container uses the source code for the third-party software module and the software modules on which the third-party software module depends.

12. The non-transitory computer-readable medium of claim 3, wherein the third-party software module depends on a fourth-party software module, and the operations further comprise:
  determining that source code for the fourth-party software module is not available; and
  importing the fourth-party software module into the second container from a repository when the source code for the fourth-party software module is not available.

13. The non-transitory computer-readable medium of claim 3, wherein the first container comprises a configuration that includes instructions for performing the build process for the software application in the first container.

14. The non-transitory computer-readable medium of claim 3, wherein the operations further comprise, prior to importing the source code for the third-party software module:
  retrieving the source code for the third-party software module from a provider of the third-party software module; and
  performing an automated validation process on the source code for the third-party software module.

15. The non-transitory computer-readable medium of claim 14, wherein the operations further comprise:
  storing the source code for the third-party software module in a repository; and
  retrieving the source code for the third-party software from the repository and importing the source code for the third-party software module into the second container.

16. The non-transitory computer-readable medium of claim 3, wherein the operations further comprise:
  determining that the source code for the software application depends on a second third-party software module;
  determining that source code for the second third-party software module is not available; and
  importing a compiled version of the second third-party software module into the first container, wherein building the software application in the first container further uses the second third-party software module.

17. The non-transitory computer-readable medium of claim 3, wherein the operations further comprise:
  determining that the source code for the software application depends on a second third-party software module;
  determining that the second third-party software module was compiled from source code in a previous software application build in a same build environment; and
  importing a compiled version of the second third-party software module into the first container from a repository, wherein building the software application in the first container further uses the second third-party software module.

18. The non-transitory computer-readable medium of claim 3, wherein the operations further comprise:
  loading a container image for the first container from a repository, wherein the container image was saved in the repository from a previous build of the software application.

19. The non-transitory computer-readable medium of claim 3, generating a dashboard interface that is updated during a build process for the software application, wherein the dashboard interface provides:
  a number of third-party software modules upon which the software application depends;
  a number of fourth-party software modules upon which the software application depends;
  a build status for the third-party software modules upon which the software application depends; and
  build types for the third-party software modules upon which the software application depends.

20. A system comprising:
  one or more processors; and
  one or more memory devices comprising instructions that, when executed by the one or more processors, cause the one or more processors to perform operations comprising:
    importing source code for a software application into a first container in which to build the software application as part of a build process;
    determining that the source code for the software application depends on a third-party software module;
    importing source code for the third-party software module into a second container;
    building the third-party software module in the second container;
    importing the third-party software module from the second container to the first container; and
    building the software application in the first container using the third-party software module and the source code for the software application.

* * * * *